(12) United States Patent
Sibbach et al.

(10) Patent No.: US 12,473,832 B2
(45) Date of Patent: Nov. 18, 2025

(54) GAS TURBINE ENGINE HAVING COMPOSITE FAN BLADES

(71) Applicant: General Electric Company, Schenectady, NY (US)

(72) Inventors: Arthur William Sibbach, Boxford, MA (US); Gary Willard Bryant, Jr., Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/603,773

(22) Filed: Mar. 13, 2024

(65) Prior Publication Data

US 2025/0290423 A1    Sep. 18, 2025

(51) Int. Cl.
*F01D 5/14* (2006.01)
(52) U.S. Cl.
CPC .......... *F01D 5/141* (2013.01); *F05D 2220/32* (2013.01); *F05D 2250/70* (2013.01)
(58) Field of Classification Search
CPC ...................................................... F01D 5/141
See application file for complete search history.

(56) References Cited

U.S. PATENT DOCUMENTS

| | | | |
|---|---|---|---|
| 5,123,813 A | 6/1992 | Przytulski et al. | |
| 5,486,095 A | 1/1996 | Rhoda et al. | |
| 6,447,250 B1 | 9/2002 | Corrigan et al. | |
| 8,403,624 B2 | 3/2013 | Xie et al. | |
| 8,869,504 B1 | 10/2014 | Schwarz et al. | |
| 9,399,922 B2 | 7/2016 | Lamboy et al. | |
| 9,500,126 B2 | 11/2016 | Schwarz et al. | |
| 10,458,425 B2 | 10/2019 | Boyer et al. | |
| 10,578,018 B2 | 3/2020 | Schwarz et al. | |
| 10,605,117 B2 | 3/2020 | Wang et al. | |
| 10,738,630 B2 | 8/2020 | Li et al. | |
| 10,760,488 B2 | 9/2020 | Schwarz et al. | |
| 11,492,918 B1 | 11/2022 | Ostdiek | |
| 2016/0032729 A1 | 2/2016 | Turner | |
| 2020/0123921 A1 | 4/2020 | Kray et al. | |
| 2020/0123925 A1 | 4/2020 | Finlayson et al. | |

OTHER PUBLICATIONS

Co-Pending U.S. Appl. No. 18/308,105, filed Apr. 27, 2023.

*Primary Examiner* — Courtney D Heinle
*Assistant Examiner* — John S Hunter, Jr.
(74) *Attorney, Agent, or Firm* — Dority & Manning, P.A.

(57) ABSTRACT

A gas turbine engine includes: a turbomachine comprising a drive turbine and defining a working gas flowpath and an inlet to the working gas flowpath; a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio during operation of the gas turbine engine in a cruise operating mode; and a reduction gearbox mechanically coupling the drive turbine of the turbomachine to the fan; wherein the gas turbine engine defines a Fan Leading Edge to Trailing Edge Compression Factor (FLTCF) greater than or equal to 1.05 and less than or equal to 1.8.

23 Claims, 4 Drawing Sheets

| | RHUB_LE (IN) | RHUB_TE (IN) | RFAN_LE (IN) | RFAN_TE(IN) | FAN BLADE COUNT | FAN TRUST RATING (LBS) | FLTCF | FLTOR |
|---|---|---|---|---|---|---|---|---|
| EXAMPLE 1 | 18 | 25 | 61 | 61 | 22 | 95000 | 1.41 | 1.22 |
| EXAMPLE 2 | 20 | 26 | 64 | 62 | 22 | 115000 | 1.35 | 1.22 |
| EXAMPLE 3 | 15 | 22 | 56 | 54 | 18 | 75000 | 1.45 | 1.24 |
| EXAMPLE 4 | 15 | 21 | 52 | 51 | 18 | 66000 | 1.37 | 1.21 |
| EXAMPLE 5 | 15 | 24 | 67 | 65 | 16 | 110000 | 1.60 | 1.26 |
| EXAMPLE 6 | 22 | 25 | 77 | 77 | 14 | 35000 | 1.11 | 1.06 |
| EXAMPLE 7 | 11 | 15 | 44 | 44 | 22 | 35000 | 1.42 | 1.17 |
| EXAMPLE 8 | 12 | 15 | 41 | 40 | 22 | 25000 | 1.26 | 1.13 |

GAS TURBINE ENGINE HAVING COMPOSITE FAN BLADES

FIELD

The present disclosure relates to a gas turbine engine having composite fan blades.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extract energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The term "turbomachine" refers to a machine including one or more compressors, a heat generating section (e.g., a combustion section), and one or more turbines that together generate a torque output.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The term "disk loading" refers to an average pressure change across a plurality of rotor blades of a rotor assembly, such as the average pressure change across a plurality of fan blades of a fan.

As used herein, the term "rated speed" with reference to a gas turbine engine refers to a maximum rated speed of the gas turbine engine. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "cruise operating mode" refers to a specific configuration or setting of the gas turbine engine that controls for, e.g., performance and fuel efficiency during a cruise phase of flight.

The term "thrust rating" for a gas turbine engine refers to a maximum amount of thrust the gas turbine engine can generate when operating at the rated speed during standard day operating conditions (i.e., sea level under standard temperature and pressure conditions).

As used herein, the term "fan pressure ratio" as it relates to a plurality of fan blades of a fan, refers to a ratio of an air pressure immediately downstream of the fan blades during operation of the fan to an air pressure immediately upstream of the fan blades of the fan during operation of the fan.

The term "bypass ratio" refers to a ratio in a gas turbine engine of a mass flowrate of an airflow from a primary fan that is bypassed around the engine's upstream-most ducted inlet (downstream of the primary fan of the engine) to a mass flowrate of an airflow that passes through the engine's ducted inlet. For example, in the embodiment of FIGS. 1, and 4 discussed below, the bypass ratio refers to a mass flowrate of an airflow from a fan 38, 152 that flows over an outer casing 18 or a fan cowl 170 to a mass flowrate of an airflow from the fan 38, 152 that flows through the engine inlet 20, 182. The bypass ratio may be defined during operation of the gas turbine engine in a cruise operating mode.

As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof)

and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, a gas turbine engine includes a fan and a turbomachine, with the turbomachine rotating the fan to generate thrust. The turbomachine includes a compressor section, a combustion section, a turbine section, and an exhaust section and defines a working gas flowpath therethrough. With a gas turbine engine gas turbine engine, and in particular with a high-bypass gas turbine engine, the gas turbine engine further defines a bypass ratio characterizing a ratio of a mass flowrate of airflow over the turbomachine to a mass flowrate of airflow through the working gas flowpath (more particularly defined above).

In order to provide high levels of thrust in a relatively efficient manner, certain gas turbine engines includes a relatively large fan. The inventors of the present disclosure sought out to design a gas turbine engine with a fan having an increased efficiency for a desired overall thrust output of the gas turbine engine.

Conventionally, fan blades are formed of a metal material, which generally provides for desirably thin and light fan blades. In some designs, the thickness of the fan blades drives a hub radius for the fan, which in turn affects an overall size of the fan, as a larger hub radius leads to a larger fan radius for a given thrust design point. While forming the fan blades out of metal is a cost effective manufacturing method that is widely used, the inventors found that a size of the fan blades may be limited with such construction due to the mechanical properties of the metal being used.

In particular, the inventors found that by forming fan blades of the fan out of a composite material, a size of the fan blades could be increased (both in radial length and chord length), as the composite material provides improved strength characteristics over certain metal materials traditionally used for fan blade design. This increase in size, the inventors found, allowed for a reduced fan pressure ratio for a given thrust design point of the gas turbine engine. More specifically, by forming the fan blades out of the composite material, the inventors designed the fan to have a lower solidity and lower fan blade count for the given thrust design point of the gas turbine engine as a result of the increased size of the fan blades.

Conventional design has indicated against such a change in fan blade composition, as forming the fan blades out of composite materials generally results in thicker fan blades, which can be challenging at the hub. However, the inventors found that the lower solidity and lower fan blade count allowed for the fan designed by the inventors to unexpectedly have a lower hub radius (particularly at the leading edge of the fan blades), improving efficiency of the fan at the hub, and allowing for overall shorter fan blades as the fan blades can "start" at a closer radial distance to a centerline of the gas turbine engine.

Further, the inventors of the present disclosure found that by including a reduction gearbox, a rotational speed of the fan may be reduced, further reducing the fan pressure ratio of the fan. While slowing the fan blades down too much can result in a stall at the fan during certain operations, by increasing the size of the fan blades, as is allowed through use of the composite fan blades, the inventors found that the fan may still provide for the desired mass flowrate of airflow thereacross to provide the desired thrust output.

In particular, the inventors discovered, unexpectedly, in the course of designing a gas turbine engine having a fan with composite fan blades, that the costs associated with inclusion of a fan with composite fan blades can be overcome by the aeronautical efficiency benefits to the fan in at least certain designs, contrary to previous thinking and expectations. In particular, the inventors discovered during the course of designing several gas turbine engines having fans with composite fan blades of varying thrust classes and aeronautical efficiency requirements (including the configurations illustrated and described in detail herein), a relationship exists among a leading edge tip radius of a fan blade of the fan, a leading edge hub radius of the fan, a trailing edge tip radius of the fan blade of the fan, and a trailing edge hub radius of the fan, whereby including a fan with composite fan blades in accordance with one or more of the exemplary aspects described herein may result in a net benefit to the overall gas turbine engine design. Notably, the leading edge and trailing edge hub radii (for given leading edge and trailing edge tip radii) are driven by, and correlate to, a solidity and fan blade count of the fan, as lower leading edge and trailing edge hub radii (for given leading edge and trailing edge tip radii) require a fan with a lower solidity and a lower fan blade count.

As briefly noted above, previous thinking was to form fan blades out of metal which avoids the costly process of manufacturing components using composite materials. Manufacturing components out of composite materials is either very labor intensive or requires significant upfront automation design costs. The inventors unexpectedly found that by forming the fan blades out of a composite material, the updated designs of the fan that are enabled result in gas turbine engines with aeronautical efficiency improvements that outweighed the challenges associated with manufacturing the fan blades using composite materials.

In particular, with a goal of arriving at an improved gas turbine engine capable of providing an improved aeronautical efficiency, the inventors proceeded in the manner of designing gas turbine engines having a fan (with composite fan blades) with various leading edge tip radii, leading edge hub radii, trailing edge tip radii, and trailing edge hub radii; checking an operability and aeronautical efficiency characteristics of the designed gas turbine engines; redesigning the gas turbine engines to vary the noted parameters based on the impact on other aspects of the gas turbine engines; rechecking the operability and aeronautical efficiency characteristics of the redesigned gas turbine engines; etc. during the design of several different types of fans with composite fan blades, including the fans with composite fan blades described herein, which are described below in greater detail.

Figure 1:
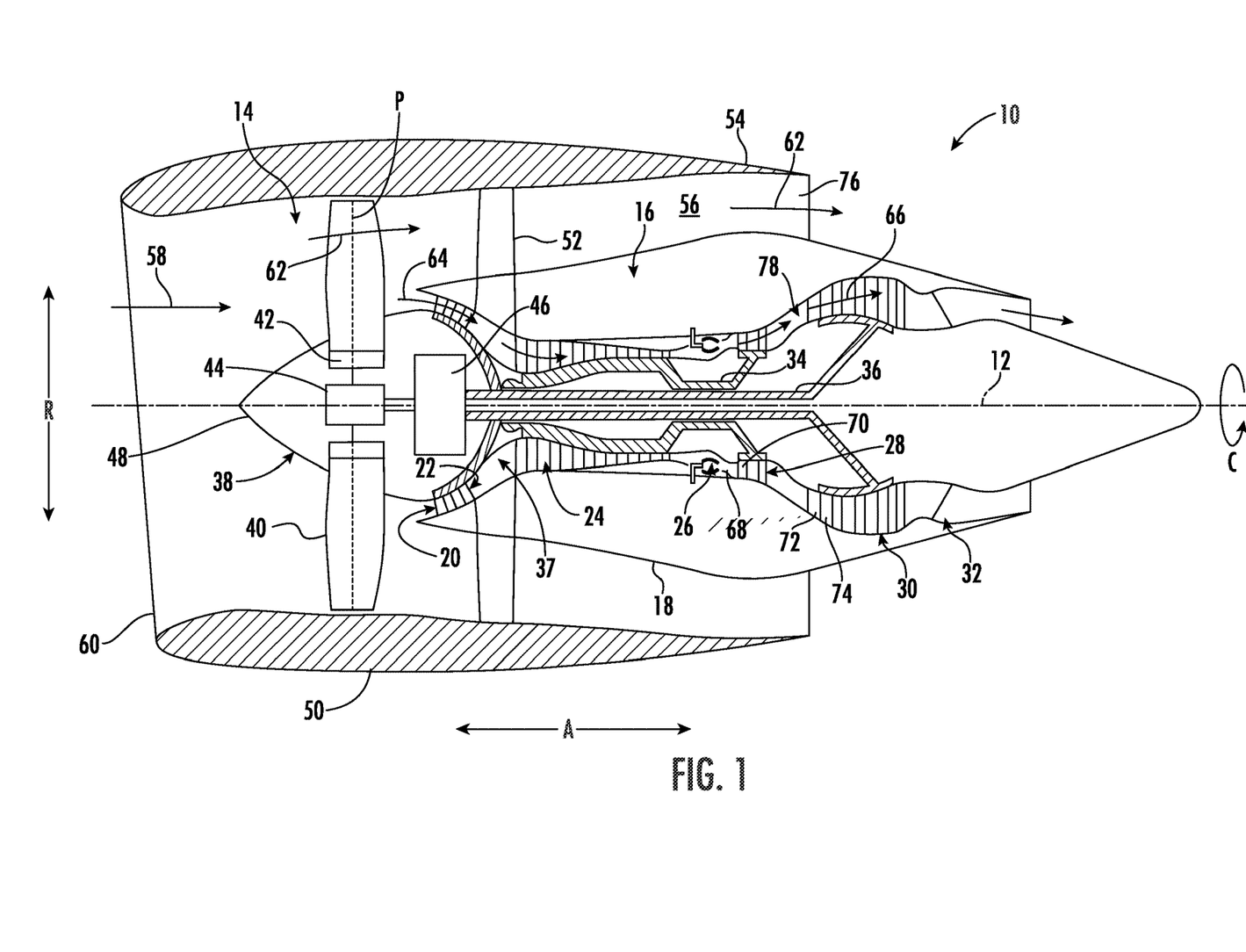
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, which supports operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, which supports operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have other configurations. For example, although the gas turbine engine 10 depicted is configured as a ducted gas turbine engine (i.e., including the outer nacelle 50, also referred to herein as a turbofan engine), in other embodiments, the gas turbine engine 10 may be an unducted gas turbine engine (such that the fan 38 is an unducted fan, and the outlet guide vanes 52 are cantilevered from the outer casing 18; see, e.g., FIG. 4; also referred to herein as an open rotor engine). Additionally, or alternatively, although the gas turbine engine 10 depicted is configured as a variable pitch gas turbine engine (i.e., including a fan 38 configured as a variable pitch fan), in other embodiments, the gas turbine engine 10 may alternatively be configured as a fixed pitch gas turbine engine (such that the fan 38 includes fan blades 40 that are not rotatable about a pitch axis P).

Figure 2:
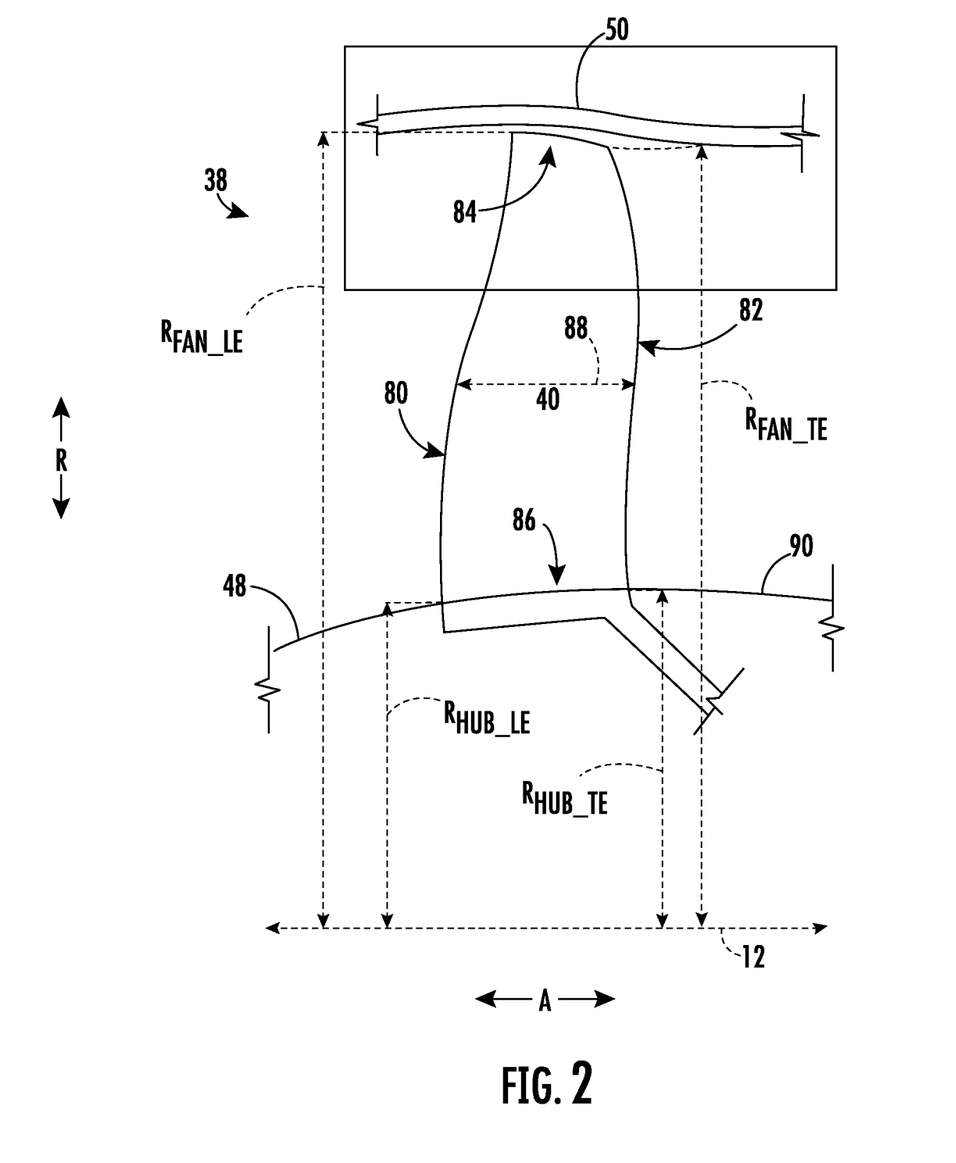
FIG. 2 is a close-up view of a blade of the gas turbine engine of FIG. 1 in accordance with an exemplary aspect of the present disclosure.

Referring now to FIG. 2, a close-up view is provided of the fan 38 of the gas turbine engine 10 of FIG. 1, and in particular of a fan blade 40 of the fan 38 of the gas turbine engine 10 of FIG. 1. The fan blade 40 generally defines a leading edge 80, a trailing edge 82, an outer tip 84 along the radial direction R, a base 86 along the radial direction R, and a chord 88 from the leading edge 80 to the trailing edge 82.

Further, it will be appreciated that the fan 38 defines a leading edge (LE) fan radius $R_{Fan\_LE}$ of the fan blade 40, a trailing edge (TE) fan radius $R_{Fan\_TE}$ of the fan blade 40, a leading edge hub radius $R_{Hub\_LE}$ of the fan 38, and a trailing edge hub radius $R_{Hub\_TE}$ of the fan 38. The leading edge fan radius $R_{Fan\_LE}$ of the fan blade 40 is a measure along the radial direction R from the longitudinal centerline 12 of the gas turbine engine 10 to the outer tip 84 of the fan blade 40 at the leading edge 80. The trailing edge fan radius $R_{Fan\_TE}$ of the fan blade 40 is a measure along the radial direction R from the longitudinal centerline 12 of the gas turbine engine 10 to the outer tip 84 of the fan blade 40 at the trailing edge 82. The leading edge hub radius $R_{Hub\_LE}$ of the fan 38 is a measure along the radial direction R from the longitudinal centerline 12 of the gas turbine engine 10 to the base 86 of the fan blade 40 at the leading edge 80 (where the leading edge 80 meets the spinner/front hub 48). The trailing edge hub radius $R_{Hub\_TE}$ of the fan 38 is a measure along the radial direction R from the longitudinal centerline 12 of the gas turbine engine 10 to the base 86 of the fan blade 40 at the trailing edge 82 (where the trailing edge 82 meets a casing 90 defining in part an airflow path to receive airflow from the fan 38).

Further, it will be appreciated that the fan blade 40 (and each of the fan blades 40 of the fan 38) are formed of a composite material. It will be appreciated that as used herein, the phrase "formed of a composite material," with reference to the fan blades 40, refers to at least 80% by weight of the fan blades 40, between the base 86 and the outer tip 84, being formed of one or more composite materials.

As alluded to earlier, the inventors discovered, unexpectedly during the course of designing gas turbine engines having a fan with composite fan blades—i.e., designing gas turbine engines having a fan (with composite fan blades) with various leading edge tip radii, leading edge hub radii, trailing edge tip radii, and trailing edge hub radii, and evaluating an overall engine and aeronautical efficiency performance—a significant relationship between the leading edge tip radii, leading edge hub radii, trailing edge tip radii, and trailing edge hub radii. The relationship can be thought of as an indicator of the ability of a gas turbine engine having a fan with composite fan blades to be able to provide a desired aeronautical efficiency for a given level of desired thrust output for the gas turbine engine. As will be appreciated, and as discussed above, the leading edge and trailing edge hub radii (for given leading edge and trailing edge tip radii) are driven by, and correlate to, a solidity and fan blade count of the fan, enabled by the formation of the fan blades out of composite materials, as lower leading edge and trailing edge hub radii (for given leading edge and trailing edge tip radii) require a fan with a lower solidity and a lower fan blade count.

The relationship applies to a gas turbine engine having a reduction gearbox to reduce a rotational speed of the fan relative to a driving turbine of a turbomachine of the gas turbine engine, a fan having fan blades formed of a composite material, and a high bypass ratio (i.e., a bypass ratio greater than or equal to 10). The relationship ties together a leading edge tip radius of a fan blade of the fan, a leading edge hub radius of the fan, a trailing edge tip radius of the fan blade of the fan, and a trailing edge hub radius of the fan, as described in more detail herein.

In particular, the inventors discovered that when designing a gas turbine engine, inclusion of a fan having fan blades with a large leading edge tip radius, the fan pressure ratio and rotational speed of the fan may be decreased, resulting generally in more efficiency. However, to avoid stall and generate a desired thrust output, a chord of the fan blades needs to be increased to ensure a sufficient airflow is provided through the fan. As the chord of the fan blade increases, the trailing edge tip radius of the fan blades may also increase to achieve a desired fan pressure ratio. Notably, however, the inventors found that increasing the leading edge tip radius too much resulted in increased weight and drag, offsetting the aerodynamic benefits otherwise achieved.

Further, with the chords of the fan blades increasing, the inventors of the present disclosure found that the solidity and fan blade count of the fan may be reduced, which may in turn result in lower leading edge and trailing edge hub radii (despite an increase in individual fan blade thickness as a result of forming the fan blades with composite materials). However, the inventors of the present disclosure found that the trailing edge hub radii could not be reduced too much without negatively affecting aerodynamics of an airflow into an inlet to the turbomachine, and the leading edge hub radii could not deviate too much from the trailing edge hub radii without negatively affecting a fan pressure ratio of the fan.

The relationship discovered, infra, can therefore identify a gas turbine engine having a fan having fan blades formed of a composite material, a reduction gearbox, and a high bypass ratio capable of achieving a desired aeronautical efficiency, while avoiding a prohibitive drag and weight increases, aerodynamic penalties, or combinations thereof and suited for particular mission requirements, one that takes into account efficiency, weight, structural needs for the fan blades, complexity, reliability, and other factors influencing the optimal choice for a gas turbine engine having a fan having fan blades formed of a composite material, a reduction gearbox, and a high bypass ratio.

In addition to yielding an improved gas turbine engine as noted above, utilizing this relationship, the inventors found that the number of suitable or feasible gas turbine engine designs capable of meeting the above design requirements could be greatly diminished, which facilitates a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

One such relationship providing for improved gas turbine engines, discovered by the inventors, is a Fan Leading Edge to Trailing Edge Compression Factor (FLTCF), expressed as:

$$FLTCF = \frac{R_{Fan\_LE} \times R_{Hub\_TE}}{R_{Fan\_TE} \times R_{Hub\_LE}}.$$

In the above expression of FLTCG, $R_{Fan\_LE}$ is a leading edge fan radius of a fan blade of a fan of a gas turbine engine, $R_{Fan\_TE}$ is a trailing edge fan radius of the fan blade of the fan of the gas turbine engine, $R_{Hub\_LE}$ is a leading edge hub radius of the fan of the gas turbine engine, and $R_{Hub\_TE}$ is a trailing edge hub radius of the fan of the gas turbine engine.

Another such relationship providing for the improved gas turbine engines, discovered by the inventors, is a Fan Leading Edge to Trailing Edge Opening Ratio (FLTOR), expressed as:

$$FLTOR = \frac{R_{Fan\_LE} - R_{Hub\_LE}}{R_{Fan\_TE} - R_{Hub\_TE}}.$$

In the above expression of FLTCG, $R_{Fan\_LE}$ is a leading edge fan radius of a fan blade of a fan of a gas turbine engine, $R_{Fan\_TE}$ is a trailing edge fan radius of the fan blade of the fan of the gas turbine engine, $R_{Hub\_LE}$ is a leading edge hub radius of the fan of the gas turbine engine, and $R_{Hub\_TE}$ is a trailing edge hub radius of the fan of the gas turbine engine.

Figure 3:
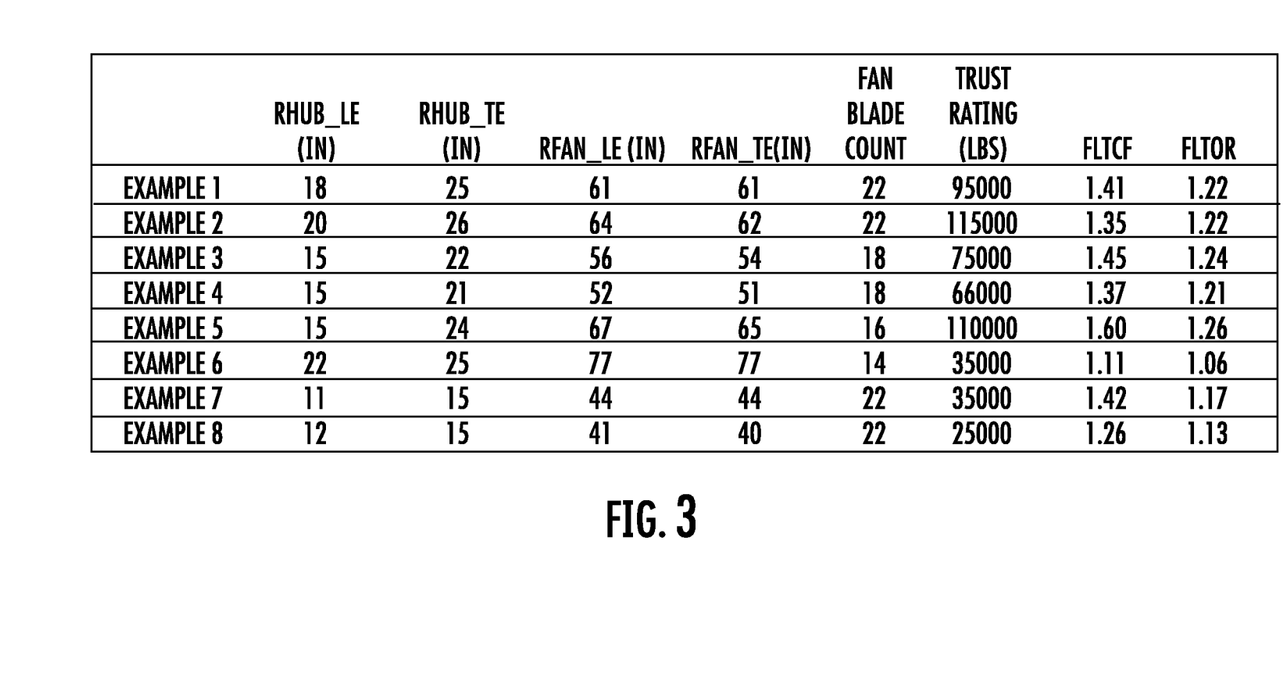
FIG. 3 is a table of example engines of the present disclosure.

Example engines in accordance with one or more exemplary embodiments of the present disclosure are provided in the table of FIG. 3. The FLTCF is valid only when it is greater than or equal to 1.05 and less than or equal to 1.8. For example, in certain exemplary embodiments, the FLTCF is greater than or equal to 1.07 and less than or equal to 1.65. Further, the FLTOR is valid only when it is greater than or equal to 1.03 and less than or equal to 1.5. For example, in certain exemplary embodiments, the FLTOR is greater than or equal to 1.05 and less than or equal to 1.3.

Notably, each of exemplary engines noted in FIG. 3 defines a bypass ratio greater than or equal to 10 and less than or equal to 30, such as greater than or equal to 13 and less than or equal to 25. Further, each of the exemplary engines noted in FIG. 3 includes a reduction gearbox (and thus may be referred to as a geared gas turbine engine) defining a gear ratio greater than or equal to 2 and less than or equal to 14.

For example, in one exemplary embodiment, the gas turbine engine may be an unducted gas turbine engine (also referred to as an "open rotor engine") including an unducted fan having fan blades formed of a composite material (see, e.g., the embodiment of FIG. 4, described below). In such an exemplary embodiment, a leading edge fan radius $R_{Fan\_LE}$ of a fan blade of the fan is greater than or equal to 65 inches and less than or equal to 85 inches, the fan defines a fan blade count greater than or equal to 5 and less than or equal to 15, a reduction gearbox defines a gear ratio greater than 4 and less than 12, and a thrust rating for the engine is between 20,000 pounds and 45,000 pounds. With such an exemplary embodiment the FLTCF is greater than or equal to 1.07 and less than or equal to 1.25, and the FLTOR is greater than or equal to 1.03 and less than or equal to 1.12. In such a manner, it will be appreciated that forming the fan blades of a composite material with this exemplary gas turbine engine enabled a size of the fan (both radially and in a chordwise direction) to be increased, allowing for a desired thrust output, despite a reduction in the fan blade count of the fan and solidity of the fan blades. Example 6 in FIG. 3 is an exemplary embodiment of such a gas turbine engine.

Further for example, in another exemplary embodiment, the gas turbine engine is a ducted gas turbine engine including an outer nacelle surrounding at least in part a fan of the gas turbine engine, with the fan having fan blades formed of a composite material (see, e.g., the embodiment of FIGS. 1 and 2, described above). In such an exemplary embodiment, a leading edge fan radius $R_{Fan\_LE}$ of a fan blade of the fan is greater than or equal to 35 inches and less than or equal to 50 inches, the fan defines a fan blade count greater than or equal to 12 and less than or equal to 23, a reduction gearbox defines a gear ratio greater than 2 and less than 4, and a thrust rating for the engine is between 20,000 pounds and 45,000 pounds. With such an exemplary embodiment the FLTCF is greater than or equal to 1.12 and less than or equal to 1.35, and the FLTOR is greater than or equal to 1.06 and less than or equal to 1.19. In such a manner, it will be appreciated that forming the fan blades of a composite material with this exemplary gas turbine engine enabled a size of the fan (e.g., in a chordwise direction) to be increased, allowing for a desired thrust output, despite a potential reduction in the fan blade count of the fan and solidity of the fan blades. Example 8 in FIG. 3 is an exemplary embodiment of such a gas turbine engine.

For example, in yet another exemplary embodiment, the gas turbine engine is a ducted gas turbine engine including an outer nacelle surrounding at least in part a fan of the gas turbine engine, with the fan having fan blades formed of a composite material (see, e.g., the embodiment of FIGS. 1 and 2, described above). In such an exemplary embodiment, a leading edge fan radius $R_{Fan\_LE}$ of a fan blade of the fan is greater than or equal to 51 inches and less than or equal to 66 inches, the fan defines a fan blade count greater than or equal to 17 and less than or equal to 23, a reduction gearbox defines a gear ratio greater than 1 and less than 4, and a thrust rating for the engine is between 60,000 pounds and 118,000 pounds. With such an exemplary embodiment the FLTCF is greater than or equal to 1.27 and less than or equal to 1.5, and the FLTOR is greater than or equal to 1.18 and less than or equal to 1.25. In such a manner, it will be appreciated that forming the fan blades of a composite material with this exemplary gas turbine engine enabled a size of the fan (e.g., in a radial direction and in a chordwise direction) to be increased, allowing for a desired thrust output, despite a potential reduction in the fan blade count of the fan and solidity of the fan blades. Examples 1 through 4 in FIG. 3 are exemplary embodiments of such a gas turbine engine.

Further for example, in still another exemplary embodiment, the gas turbine engine is a ducted gas turbine engine including an outer nacelle surrounding at least in part a fan of the gas turbine engine, with the fan having fan blades formed of a composite material (see, e.g., the embodiment of FIGS. 1 and 2, described above). In such an exemplary embodiment, a leading edge fan radius $R_{Fan\_LE}$ of a fan blade of the fan is greater than or equal to 55 inches and less than or equal to 70 inches, the fan defines a fan blade count greater than or equal to 12 and less than or equal to 22 (e.g., less than or equal to 19), a reduction gearbox defines a gear ratio greater than 1 and less than 4, and a thrust rating for the engine is between 100,000 pounds and 150,000 pounds (such as greater than 118,000 pounds and less than 150,000 pounds). With such an exemplary embodiment the FLTCF is greater than or equal to 1.46 and less than or equal to 1.65, and the FLTOR is greater than or equal to 1.2 and less than or equal to 1.5 (such as greater than or equal to 1.25 and less than 1.5). In such a manner, it will be appreciated that forming the fan blades of a composite material have enabled a size of the fan (e.g., in a radial direction and in a chordwise direction) to be increased, allowing for a desired thrust output, despite a potential reduction in the fan blade count of the fan and solidity of the fan blades. Example 5 in FIG. 3 is an exemplary embodiments of such a gas turbine engine.

Figure 4:
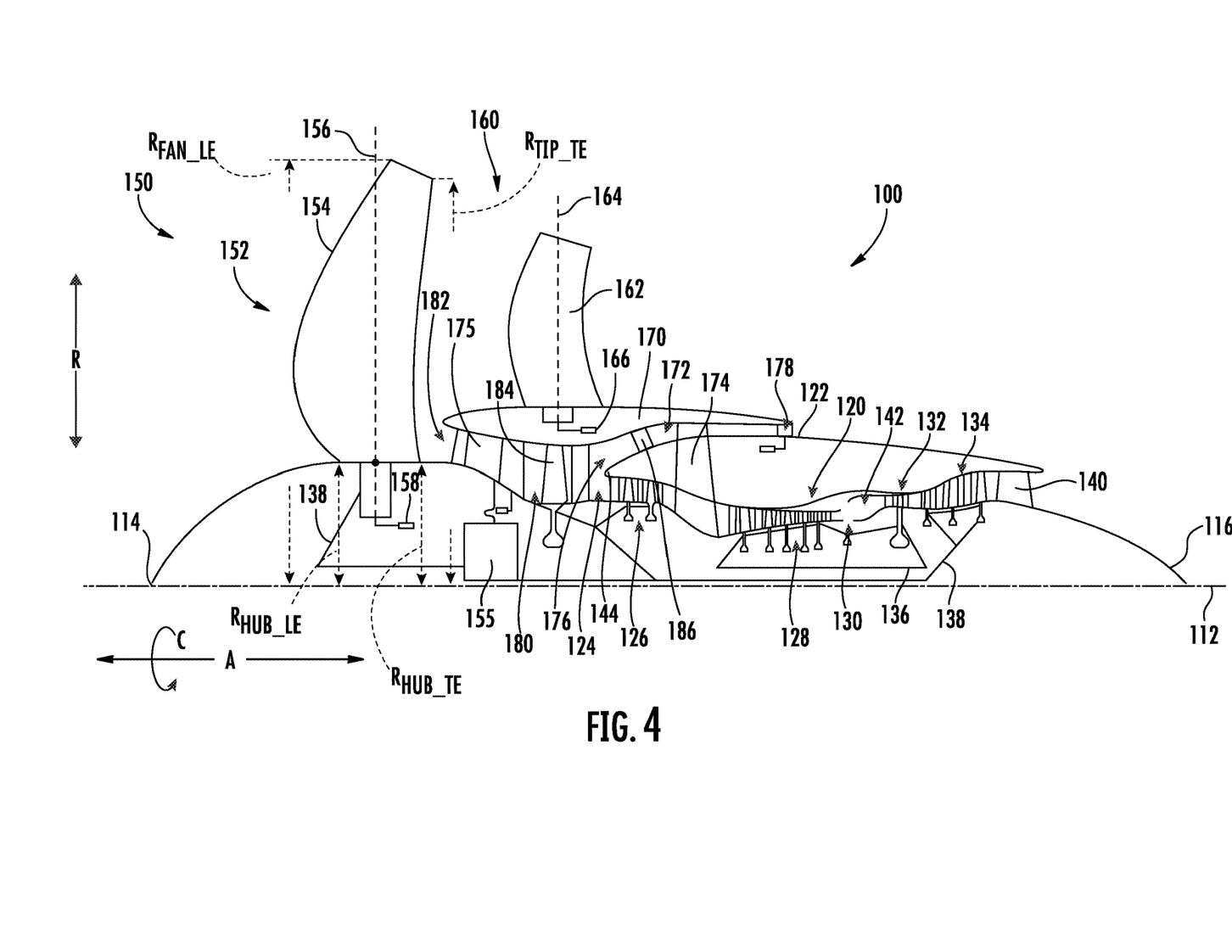
FIG. 4 is a cross-sectional view of a gas turbine engine in accordance with another exemplary aspect of the present disclosure

Referring now to FIG. 4, a schematic cross-sectional view of a gas turbine engine 100 is provided according to another example embodiment of the present disclosure. The exemplary gas turbine engine 100 of FIG. 4 may be configured in substantially the same manner as the exemplary gas turbine engine 100 described above with reference to FIGS. 1 and 2.

For example, the exemplary gas turbine engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

Further, the exemplary gas turbine engine 100 generally includes a fan section 150 and a turbomachine 120. Generally, the turbomachine 120 includes, in serial flow order, a compressor section, a combustion section, a turbine section, and an exhaust section. Particularly, as shown in FIG. 4, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP")

compressor 126; a high pressure ("HP") compressor 128; a combustor 130; a high pressure turbine 132; and a low pressure turbine 134. The high pressure turbine 128 drives the high pressure compressor 128 through a high pressure shaft 136. The low pressure turbine 134 drives the low pressure compressor 126 and components of the fan section 150 through a low pressure shaft 138, and as such may be referred to as a drive turbine. After driving each of the turbines 132, 134, combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. By contrast to the embodiment of FIG. 1, for the depicted embodiment of FIG. 4, the fan 152 is an open rotor or unducted fan 152. In such a manner, the gas turbine engine 100 may be referred to as an open rotor engine.

As depicted, the fan 152 includes an array of fan blades 154 (only one shown in FIG. 4). The fan blades 154 are rotatable, e.g., about the longitudinal axis 112. As noted above, the fan 152 is drivingly coupled with the low pressure turbine 134 via the LP shaft 138. As with the exemplary embodiments discussed above, the fan blades 154 are formed of a composite material.

Further for the embodiments shown in FIG. 4, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 4) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 4 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

By contrast to the embodiment of FIG. 1, as shown in FIG. 4, in addition to the unducted fan 152, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 4) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 4). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Moreover, referring still to FIG. 4, in exemplary embodiments, air passing through the fan duct 172 may be relatively cooler (e.g., lower temperature) than one or more fluids utilized in the turbomachine 120. In this way, one or more heat exchangers 186 may be positioned in thermal communication with the fan duct 172. For example, one or more heat exchangers 186 may be disposed within the fan duct 172 and utilized to cool one or more fluids from the core engine with the air passing through the fan duct 172, as a resource for removing heat from a fluid, e.g., compressor bleed air, oil or fuel.

Although not depicted in the example of FIG. 4, the heat exchanger 186 may be an annular heat exchanger extending substantially 360 degrees in the fan duct 172 (e.g., at least 300 degrees, such as at least 330 degrees). In such a manner, the heat exchanger 186 may effectively utilize the air passing through the fan duct 172 to cool one or more systems of the engine 100 (e.g., lubrication oil systems, compressor bleed air, electrical components, etc.). The heat exchanger 186 uses the air passing through duct 172 as a heat sink and correspondingly increases the temperature of the air downstream of the heat exchanger 186 and exiting the fan exhaust nozzle 178.

As will be appreciated from the description herein, various other embodiments of a gas turbine engine are provided. Certain of these embodiments may be an unducted, single rotor gas turbine engine, or a ducted gas turbine engine. Various additional aspects of one or more of these embodiments are discussed below. These exemplary aspects may be combined with one or more of the exemplary gas turbine engine(s) discussed above with respect to the figures.

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 pounds per square inch absolute (psia) and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics and provide the benefits noted herein associated with forming the fan blades from a composite material, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

Further aspects are provided by the subject matter of the following clauses:

A gas turbine engine defining a radial direction, the gas turbine engine comprising: a turbomachine comprising a drive turbine and defining a working gas flowpath and an inlet to the working gas flowpath; a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and a reduction gearbox mechanically coupling the drive turbine of the turbomachine to the fan; wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan\_LE} \times R_{Hub\_TE}}{R_{Fan\_TE} \times R_{Hub\_LE}}.$$

The gas turbine engine of any preceding clause, wherein the FLTCF is greater than or equal to 1.07 and less than or equal to 1.65.

The gas turbine engine of any preceding clause, wherein the bypass ratio is greater than or equal to 13 and less than or equal to 25.

The gas turbine engine of any preceding clause, wherein the turbomachine comprises a compressor section having a low pressure compressor and a high pressure compressor, wherein the low pressure compressor is rotatable with the drive turbine.

The gas turbine engine of any preceding clause, further comprising: an outer nacelle surrounding at least in part the fan.

The gas turbine engine of any preceding clause, wherein the fan is an unducted fan.

The gas turbine engine of any preceding clause, wherein the leading edge fan radius $R_{Fan\_LE}$ is greater than or equal to 65 inches and less than or equal to 85 inches, and wherein the fan defines a fan blade count greater than or equal to 5 and less than or equal to 15.

The gas turbine engine of any preceding clause, wherein the FLTCF is greater than or equal to 1.07 and less than or equal to 1.25.

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, and wherein the reduction gearbox defines a gear ratio between 2:1 and 4:1.

The gas turbine engine of any preceding clause, wherein the FLTCF is greater than or equal to 1.12 and less than or equal to 1.35.

The gas turbine engine of any preceding clause, wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan\_LE} - R_{Hub\_TE}}{R_{Fan\_TE} - R_{Hub\_LE}}.$$

A gas turbine engine defining a radial direction, the gas turbine engine comprising: a turbomachine comprising a drive turbine and defining a working gas flowpath and an inlet to the working gas flowpath; a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and a reduction gearbox mechanically coupling the drive turbine of the turbomachine to the fan; wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan\_LE} - R_{Hub\_LE}}{R_{Fan\_TE} - R_{Hub\_TE}}.$$

The gas turbine engine of any preceding clause, wherein the FLTOR is greater than or equal to 1.05 and less than or equal to 1.3.

The gas turbine engine of any preceding clause, wherein the bypass ratio is greater than or equal to 13 and less than or equal to 25.

The gas turbine engine of any preceding clause, further comprising: an outer nacelle surrounding at least in part the fan.

The gas turbine engine of any preceding clause, wherein the fan is an unducted fan.

The gas turbine engine of any preceding clause, wherein the leading edge fan radius $R_{Fan\_LE}$ is greater than or equal to 65 inches and less than or equal to 85 inches, wherein the fan defines a fan blade count greater than or equal to 5 and less than or equal to 15, and wherein the FLTOR is greater than or equal to 1.05 and less than or equal to 1.2.

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio between 2:1 and 4:1, and wherein the FLTOR is greater than or equal to 1.07 and less than or equal to 1.18.

The gas turbine engine of any preceding clause, wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan\_LE} \times R_{Hub\_TE}}{R_{Fan\_TE} \times R_{Hub\_LE}}.$$

The gas turbine engine of any preceding clause, wherein the fan is an unducted fan, wherein the leading edge fan radius $R_{Fan\_LE}$ is greater than or equal to 65 inches and less than or equal to 85 inches, wherein the fan defines a fan blade count greater than or equal to 5 and less than or equal to 15, wherein the reduction gearbox defines a gear ratio greater than 4 and less than 12, wherein a thrust rating for the gas turbine engine is between 20,000 pounds and 45,000 pounds, wherein the FLTCF is greater than or equal to 1.07 and less than or equal to 1.25, and wherein the FLTOR is greater than or equal to 1.03 and less than or equal to 1.12.

The gas turbine engine of any preceding clause, wherein the fan is a ducted fan, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio greater than 2 and less than 4, wherein a thrust rating for the gas turbine engine is between 20,000 pounds and 45,000 pounds, wherein the FLTCF is greater than or equal to 1.12 and less than or equal to 1.35, and wherein the FLTOR is greater than or equal to 1.06 and less than or equal to 1.19.

The gas turbine engine of any preceding clause, wherein the fan is a ducted fan, wherein the leading edge fan radius $R_{Fan\_LE}$ is greater than or equal to 51 inches and less than or equal to 66 inches, wherein the fan defines a fan blade count greater than or equal to 17 and less than or equal to 23, wherein a thrust rating for the gas turbine engine is between 60,000 pounds and 118,000 pounds, wherein the FLTCF is greater than or equal to 1.27 and less than or equal to 1.5, and wherein the FLTOR is greater than or equal to 1.18 and less than or equal to 1.5.

The gas turbine engine of any preceding clause, wherein the fan is a ducted fan, wherein the leading edge fan radius $R_{Fan\_LE}$ is greater than or equal to 55 inches and less than or equal to 70 inches, wherein the fan defines a fan blade count greater than or equal to 12 and less than or equal to 22, wherein a thrust rating for the gas turbine engine is between 100,000 pounds and 150,000 pounds, wherein the FLTCF is greater than or equal to 1.46 and less than or equal to 1.65, and wherein the FLTOR is greater than or equal to 1.2 and less than or equal to 1.5.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a radial direction, the gas turbine engine comprising:
   a turbomachine comprising a drive turbine and defining a working gas flowpath and an inlet to the working gas flowpath;
   a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and
   a reduction gearbox mechanically coupling the drive turbine of the turbomachine to the fan;
   wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

2. The gas turbine engine of claim 1, wherein the FLTCF is greater than or equal to 1.07 and less than or equal to 1.65.

3. The gas turbine engine of claim 1, wherein the bypass ratio is greater than or equal to 13 and less than or equal to 25.

4. The gas turbine engine of claim 1, wherein the turbomachine comprises a compressor section having a low pressure compressor and a high pressure compressor, wherein the low pressure compressor is rotatable with the drive turbine.

5. The gas turbine engine of claim 1, further comprising: an outer nacelle surrounding at least in part the fan.

6. The gas turbine engine of claim 1, wherein the fan is an unducted fan.

7. The gas turbine engine of claim 6, wherein the leading edge fan radius $R_{Fan\_LE}$ is greater than or equal to 65 inches and less than or equal to 85 inches, and wherein the fan defines a fan blade count greater than or equal to 5 and less than or equal to 15.

8. The gas turbine engine of claim 6, wherein the FLTCF is greater than or equal to 1.07 and less than or equal to 1.25.

9. The gas turbine engine of claim 1, wherein the leading edge fan radius $R_{Fan\_LE}$ is greater than or equal to 35 inches and less than or equal to 50 inches, wherein the fan defines a fan blade count greater than or equal to 12 and less than or equal to 23, and wherein the reduction gearbox defines a gear ratio between 2:1 and 4:1.

10. The gas turbine engine of claim 9, wherein the FLTCF is greater than or equal to 1.12 and less than or equal to 1.35.

11. The gas turbine engine of claim 1, wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}.$$

12. A gas turbine engine defining a radial direction, the gas turbine engine comprising:
   a turbomachine comprising a drive turbine and defining a working gas flowpath and an inlet to the working gas flowpath;
   a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and
   a reduction gearbox mechanically coupling the drive turbine of the turbomachine to the fan;

wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}.$$

13. The gas turbine engine of claim 12, wherein the FLTOR is greater than or equal to 1.05 and less than or equal to 1.3.

14. The gas turbine engine of claim 12, wherein the bypass ratio is greater than or equal to 13 and less than or equal to 25.

15. The gas turbine engine of claim 12, further comprising:
an outer nacelle surrounding at least in part the fan and a portion of the turbomachine.

16. The gas turbine engine of claim 12, wherein the fan is an unducted fan.

17. The gas turbine engine of claim 16, wherein the leading edge fan radius $R_{Fan\_LE}$ is greater than or equal to 65 inches and less than or equal to 85 inches, wherein the fan defines a fan blade count greater than or equal to 5 and less than or equal to 15, and wherein the FLTOR is greater than or equal to 1.05 and less than or equal to 1.2.

18. The gas turbine engine of claim 12, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio between 2:1 and 4:1, and wherein the FLTOR is greater than or equal to 1.07 and less than or equal to 1.18.

19. The gas turbine engine of claim 12, wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

20. The gas turbine engine of claim 19, wherein the fan is an unducted fan, wherein the leading edge fan radius $R_{Fan\_LE}$ is greater than or equal to 65 inches and less than or equal to 85 inches, wherein the fan defines a fan blade count greater than or equal to 5 and less than or equal to 15, wherein the reduction gearbox defines a gear ratio greater than 4 and less than 12, wherein a thrust rating for the gas turbine engine is between 20,000 pounds and 45,000 pounds, wherein the FLTCF is greater than or equal to 1.07 and less than or equal to 1.25, and wherein the FLTOR is greater than or equal to 1.03 and less than or equal to 1.12.

21. The gas turbine engine of claim 19, wherein the fan is a ducted fan, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio greater than 2 and less than 4, wherein a thrust rating for the gas turbine engine is between 20,000 pounds and 45,000 pounds, wherein the FLTCF is greater than or equal to 1.12 and less than or equal to 1.35, and wherein the FLTOR is greater than or equal to 1.06 and less than or equal to 1.19.

22. The gas turbine engine of claim 19, wherein the fan is a ducted fan, wherein the leading edge fan radius $R_{Fan\_LE}$ is greater than or equal to 51 inches and less than or equal to 66 inches, wherein the fan defines a fan blade count greater than or equal to 17 and less than or equal to 23, wherein a thrust rating for the gas turbine engine is between 60,000 pounds and 118,000 pounds, wherein the FLTCF is greater than or equal to 1.27 and less than or equal to 1.5, and wherein the FLTOR is greater than or equal to 1.18 and less than or equal to 1.5.

23. The gas turbine engine of claim 19, wherein the fan is a ducted fan, wherein the leading edge fan radius $R_{Fan\_LE}$ is greater than or equal to 55 inches and less than or equal to 70 inches, wherein the fan defines a fan blade count greater than or equal to 12 and less than or equal to 22, wherein a thrust rating for the gas turbine engine is between 100,000 pounds and 150,000 pounds, wherein the FLTCF is greater than or equal to 1.46 and less than or equal to 1.65, and wherein the FLTOR is greater than or equal to 1.2 and less than or equal to 1.5.

* * * * *